United States Patent
Whitman et al.

(10) Patent No.: US 7,502,057 B2
(45) Date of Patent: Mar. 10, 2009

(54) METHOD AND APPARATUS FOR COLOR NON-UNIFORMITY CORRECTION IN A DIGITAL CAMERA

(75) Inventors: Christopher A Whitman, Fort Collins, CO (US); Kevin J Matherson, Fort Collins, CO (US); Robert E Sobol, Fort Collins, CO (US); David K Campbell, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1185 days.

(21) Appl. No.: 10/174,970

(22) Filed: Jun. 20, 2002

(65) Prior Publication Data
US 2003/0234879 A1    Dec. 25, 2003

(51) Int. Cl.
*H04N 9/64* (2006.01)
*H04N 17/00* (2006.01)
*H04N 17/02* (2006.01)
*H04N 5/76* (2006.01)

(52) U.S. Cl. ............... 348/251; 348/187; 348/231.6

(58) Field of Classification Search ......... 382/275, 382/274, 182; 348/251, 252, 272, 273, 274, 348/275, 276, 277, 278, 279, 280; 358/525, 358/518, 520
See application file for complete search history.

(56) References Cited

U.S. PATENT DOCUMENTS

| | | | | |
|---|---|---|---|---|
| 4,520,395 A | * | 5/1985 | Abe | 348/251 |
| 4,899,294 A | * | 2/1990 | Easton et al. | 345/441 |
| 5,343,302 A | * | 8/1994 | Yamashita | 348/251 |
| 5,381,174 A | * | 1/1995 | de Groot et al. | 348/207.99 |
| 5,424,781 A | * | 6/1995 | Vlahos | 348/587 |
| 5,576,797 A | | 11/1996 | Kusaka et al. | |
| 5,764,809 A | * | 6/1998 | Nomami et al. | 382/284 |
| 5,784,100 A | * | 7/1998 | Konishi | 348/251 |
| 6,055,066 A | * | 4/2000 | Kanda | 358/461 |
| 6,091,445 A | * | 7/2000 | Matsui et al. | 348/96 |
| 6,707,500 B1 | * | 3/2004 | Tamura et al. | 348/362 |
| 6,833,862 B1 | * | 12/2004 | Li | 348/207.99 |
| 7,075,569 B2 | * | 7/2006 | Niikawa | 348/218.1 |
| 7,233,352 B2 | * | 6/2007 | Matherson et al. | 348/251 |
| 2002/0054712 A1 | * | 5/2002 | Sun | 382/274 |

FOREIGN PATENT DOCUMENTS

WO    WO 01/01675    1/2001

OTHER PUBLICATIONS

Netherlands Search Report dated Oct. 5, 2005.

\* cited by examiner

*Primary Examiner*—David L Ometz
*Assistant Examiner*—Richard M Bemben (57) ABSTRACT

Reducing or eliminated color-dependent vignetting in a digital camera includes: providing a raw array of data corresponding to an image of a scene for each color that the camera can image; and adjusting the raw arrays such that the array for each color exhibits substantially the same amount of vignetting.

36 Claims, 6 Drawing Sheets

METHOD AND APPARATUS FOR COLOR NON-UNIFORMITY CORRECTION IN A DIGITAL CAMERA

FIELD OF THE INVENTION

The invention is related to digital photography, and more particularly related to the correction of digital photographic images for color-dependent vignetting.

BACKGROUND OF THE INVENTION

Non-color-dependent or regular vignetting is a photographic phenomenon in which the picture taken by the camera exhibits a darkening from the center to the corners irrespective of what color is present. Photographs taken by both a film camera and images taken by a digital camera can exhibit vignetting. Some amount of vignetting is acceptable, and actually desirable from an artistic sense. But an excessive amount of vignetting will be objectionable to most people.

In either a film camera or a digital camera, such vignetting is caused by having to capture an image on a small flat surface, namely the film or the optical-to-electronic imager, e.g., a charge coupled device ("CCD"). In either type of camera, light striking the corners of the film/imager travel a longer path and arrive at a different angle of incidence than light which impinges directly upon the center of the film/imager.

Differences in the response of the CCD to light impinging directly versus light impinging at an angle produce non-uniformity in the data corresponding to an image, some of which is characterized as color-dependent vignetting and some of which is characterized as color-dependent vignetting. The lens system can also effect vignetting. Plus, if the camera uses a flash device, vignetting can also be due to the flash device's variation in illumination intensity across the subject.

As the name suggests, color-dependent vignetting is to be understood as a vignetting pattern that differs depending on the particular color of light. A typical color image sensor in a digital camera includes a mosaic type of image sensor, i.e., a CCD over which is formed a filter array that includes the colors red, green and blue. Each pixel has a corresponding red, green and blue filter area. A typical arrangement of the color filter array is the Bayer pattern that uses a repetition rate of four pixels, namely one red pixel, one blue pixel and two green pixels. The larger number of green pixels represents an adaptation for the increased sensitivity to green light exhibited by the human eye. The separate color arrays, or planes, of data images formed by the sensor are then combined to create a full-color image after suitable processing.

Color-dependent vignetting can be exhibited in addition to non-color-dependent vignetting. The human eye is very sensitive to color-dependent variation. Hence, color-dependent vignetting is very objectionable, even in small amounts.

Color-dependent vignetting can be minimized by using higher quality lens systems, image sensors and flash devices. But this is an impractical solution in a situation in which the minimization of system cost and/or system complexity are important design criteria.

SUMMARY OF THE INVENTION

The invention, in part, provides a method (and corresponding apparatus) for correcting color-dependent vignetting in a digital camera. Such a method comprises: providing a raw array of data corresponding to an image of a scene for each color that said camera can image; and adjusting the raw arrays such that the array for each color exhibits substantially the same amount of vignetting so as to reduce color-dependent vignetting in a composite image based upon each of the adjusted arrays.

Such technology according to the invention not only provides a method, but also a corresponding apparatus and a computer-readable medium having code portions embodied thereon (that, when executed by a processor, cause the processor to perform the method).

Additional features and advantages of the invention will be more fully apparent from the following detailed description of the example embodiments, the appended claims and the accompanying drawings.

DETAILED DESCRIPTION OF THE EXAMPLE EMBODIMENTS

An embodiment of the invention is, in part, the recognition that it is desirable to remove color-dependent vignetting without, and in some cases, while also, removing non-color dependent vignetting.

An embodiment of the invention: is, in part, a recognition that color-dependent vignetting can be reduced or eliminated without resorting to costly lens systems, flash devices and/or imager devices, e.g., charge coupled devices ("CCDs"); provides, in part, technology to correct color-dependent vignetting in a digital camera in real time; and provides, in part, technology that makes it possible for low to moderate cost digital camera architectures to achieve such correction in real time via digital processing.

Figure 1:
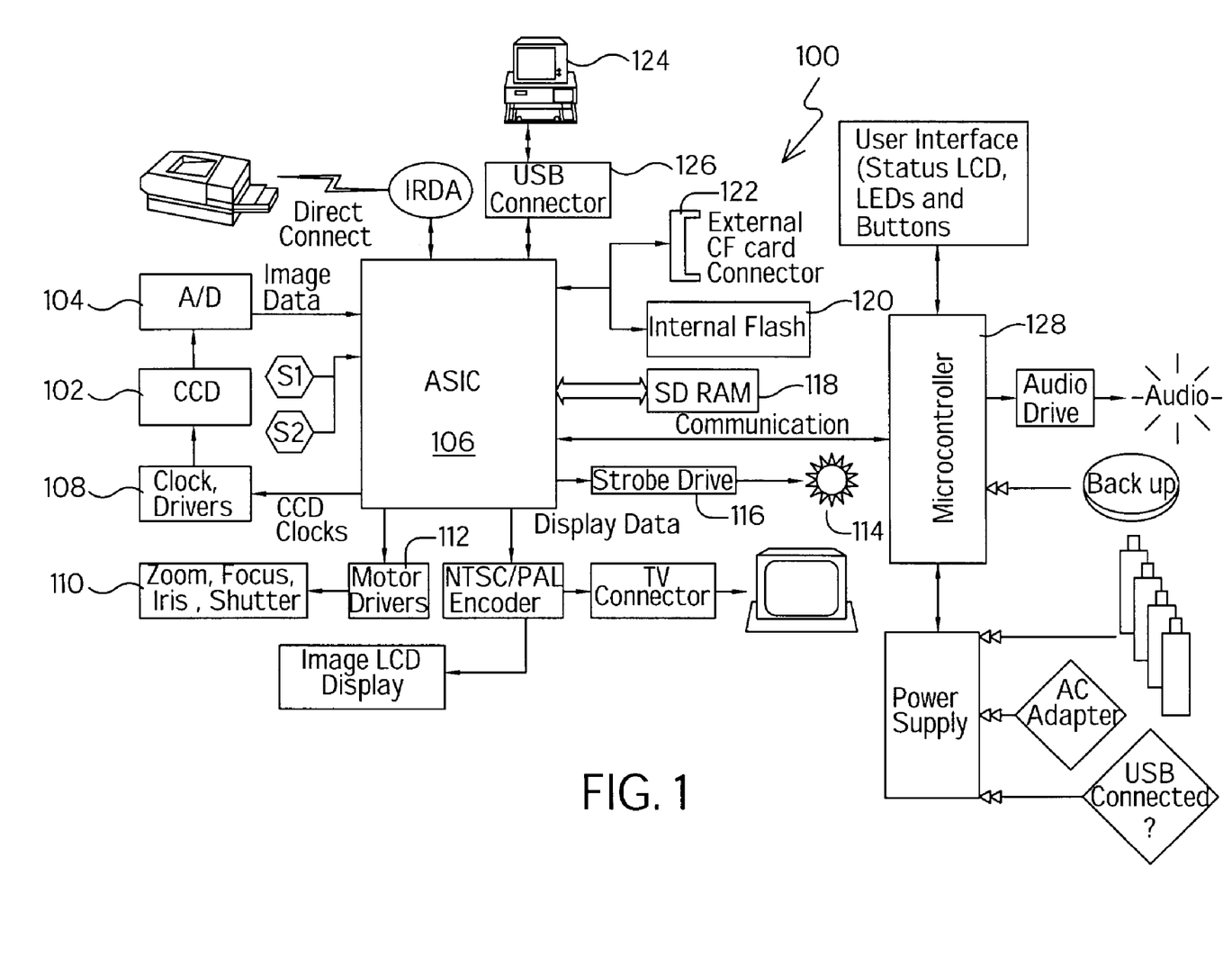
FIG. 1 is a block diagram of the architecture of a digital camera according to an embodiment of the invention.

FIG. 1 is a schematic block diagram of hardware architecture of a digital camera according to an embodiment of the invention. The digital camera 100 of FIG. 1 includes a charge-coupled-device ("CCD") 102 that provides an analog signal to an analog-to-digital ("A/D") device 104, the A/D converter 104 providing digitized output of the CCD 102 to an application-specific integrated circuit ("ASIC") 106. The ASIC 106 provides clock signals to clock drivers 108 that are used to operate the CCD 102.

The camera 100 also includes: zoom (optional), focus, iris and shutter mechanisms 110 that are operated via motor drivers 112 by the ASIC 106; and a flash unit 114 operated via a strobe drive 116 controlled by the ASIC 106; As for memory devices, the digital camera 100 includes: a volatile memory, namely a synchronous dynamic random access memory ("SDRAM") device 118; and a non-volatile memory, namely internal flash memory device 120, plus a connector 122 for connection to an external compact flash memory device. The ASIC 106 can also connect to an external work station 124, e.g., through a universal serial bus ("USB") connector 126.

The digital camera 100 also includes a microcontroller 128 with which the ASIC 106 can communicate.

Other architectures for the camera are contemplated. Each such architecture can include one or more processors, one or more volatile memory devices and one or more non-volatile memory devices.

The CCD 102 is assumed to be a mosaic sensor that produces four (4) separate color planes for each image of a scene. Such a mosaic sensor is contemplated as typically exhibiting a Bayer pattern such that any square block of pixels will have two (2) green pixels, one (1) red pixel and one (1) blue pixel.

Figure 2:
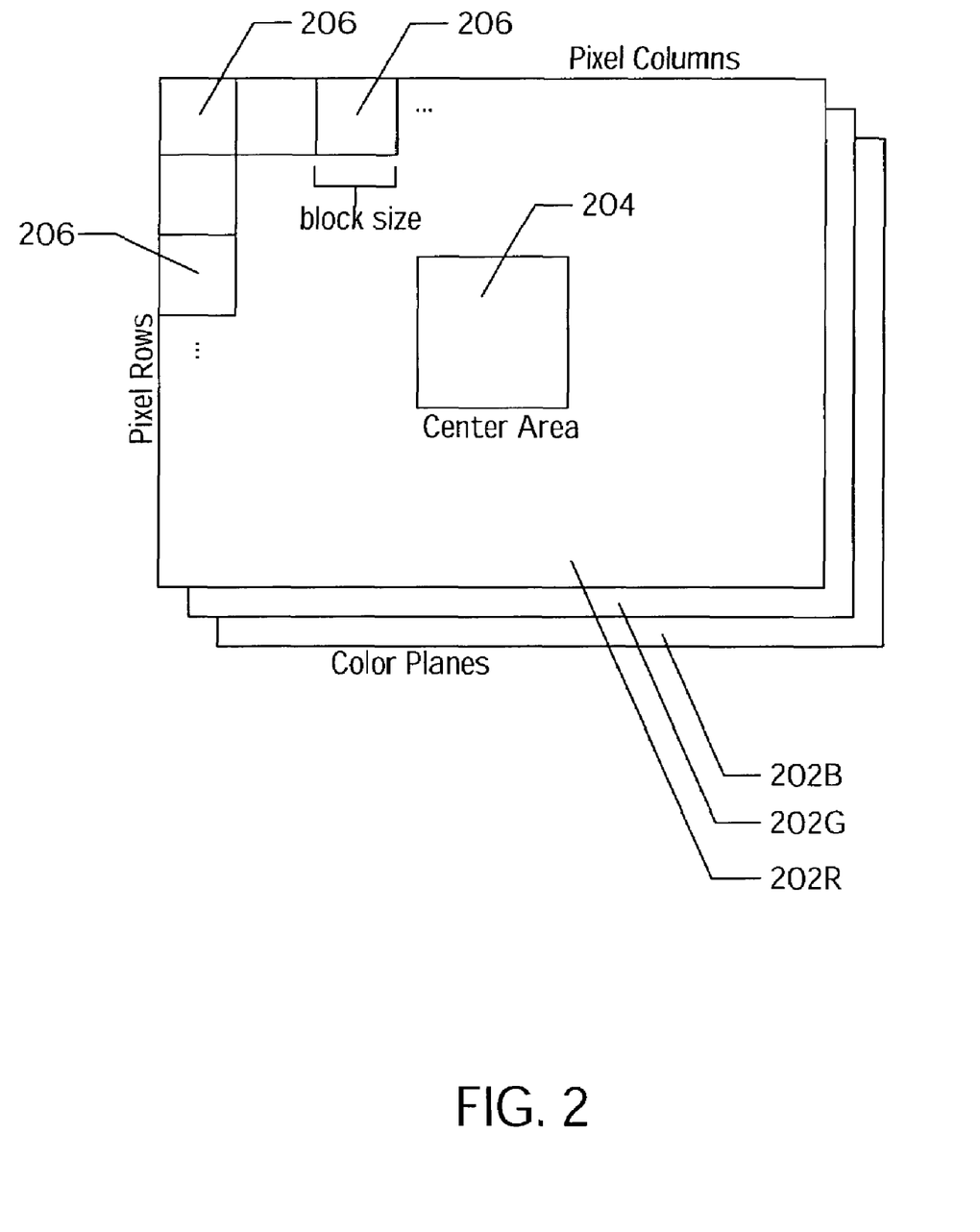
FIG. 2 is a depiction of the screen color arrays or planes corresponding to an image according to an embodiment of the invention.

Each time the digital camera 100 captures an image via the CCD 102, etc., the image 200 can be represented by three (3) color planes or arrays 202R, 202G and 202B, as depicted in FIG. 2. It is contemplated that other color systems can be used to represent the image 200, which would result in different color arrays 202. In the situation in which the subject is a white calibration source, then the image 200 represents characteristic planes or arrays that reveal the CCD's 102 fundamental or characteristic sensitivities.

To reduce consumption of the flash memory device 120, each member in a set of characteristic color planes 202 can be reduced. Reduction in size can be accomplished by dividing a color plane 202 into blocks 206 and then processing those blocks so as to form a corresponding reduced characteristic array, also known as a calibration array (not depicted in FIG. 2).

Technology for producing such a calibration set of reduced characteristic planes or arrays is disclosed in the commonly-assigned co-pending application, (HDP Ref. No. 62150-000061), filed on the same day as this application and sharing some inventors in common with this application, the entirety of which is incorporated by reference.

The combination of the lens system (not depicted), the CCD 102 and the flash device 114 will produce images that exhibit both color-dependent vignetting as well as non-color-dependent vignetting. It is known that stringent design of these components can significantly reduce each phenomenon. But such a system is very expensive and still cannot reduce the phenomena uniformly for multiple combinations of the camera's operational parameters, namely zoom, focus, iris, shutter speed, etc.

As mentioned above, an embodiment of the invention is, in part, a recognition that color-dependent vignetting, as well as non-color-dependent vignetting, can be reduced or substantially eliminated via digital manipulation of the raw color planes 202 representing an image 200 of a scene using a low-to-moderate cost combination of a CCD 102, a lens system (not depicted) and a flash 114.

Such correction of an image 200 of a scene includes temporarily storing the raw/uncorrected color planes 202R, 202G and 202B corresponding to an image 200 of the scene in, e.g., the SDRAM memory 118. Then, the raw image 200 is converted to a corrected image using an appropriate calibration set and the raw array 200 can be overwritten in the SDRAM memory 118 or the corrected image can be written to the internal flash memory 120 and the corresponding raw image 200 in the SDRAM memory 118 can be discarded.

To correct a raw image 200, the pixels can be scaled by calibration factors that correspond to the particular values of the camera's operational parameters that were in effect when any image 200 was captured.

It is expected that cost versus capability will continue to improve such that, at some point in the future, it will be cost-effective to store a calibration set for every possible combination of the camera's operational parameters. As a practical matter, given the cost versus capability of commercially available memory devices that currently are commercially available, this approach would require an internal flash memory device 120 that is too large and/or too expensive to be cost effective. So an embodiment of the invention will store a much smaller number of calibration sets along with a mapping that can be used to select an appropriate calibration set for a given set of values to which the camera's operational parameters were adjusted when the image 200 is captured.

As discussed in the copending application, an example embodiment of the invention assumes a mosaic-CCD camera that stores six (6) sets of calibration arrays. These correspond to three (3) zoom settings, (wide, medium, telephoto) and two (2) of the camera's three (3) aperture settings (1/2, 1.0). A simple look-up table (LUT) can be used to select the appropriate calibration set for the particular values to which the operating parameters of camera 100 are adjusted.

Figure 3:
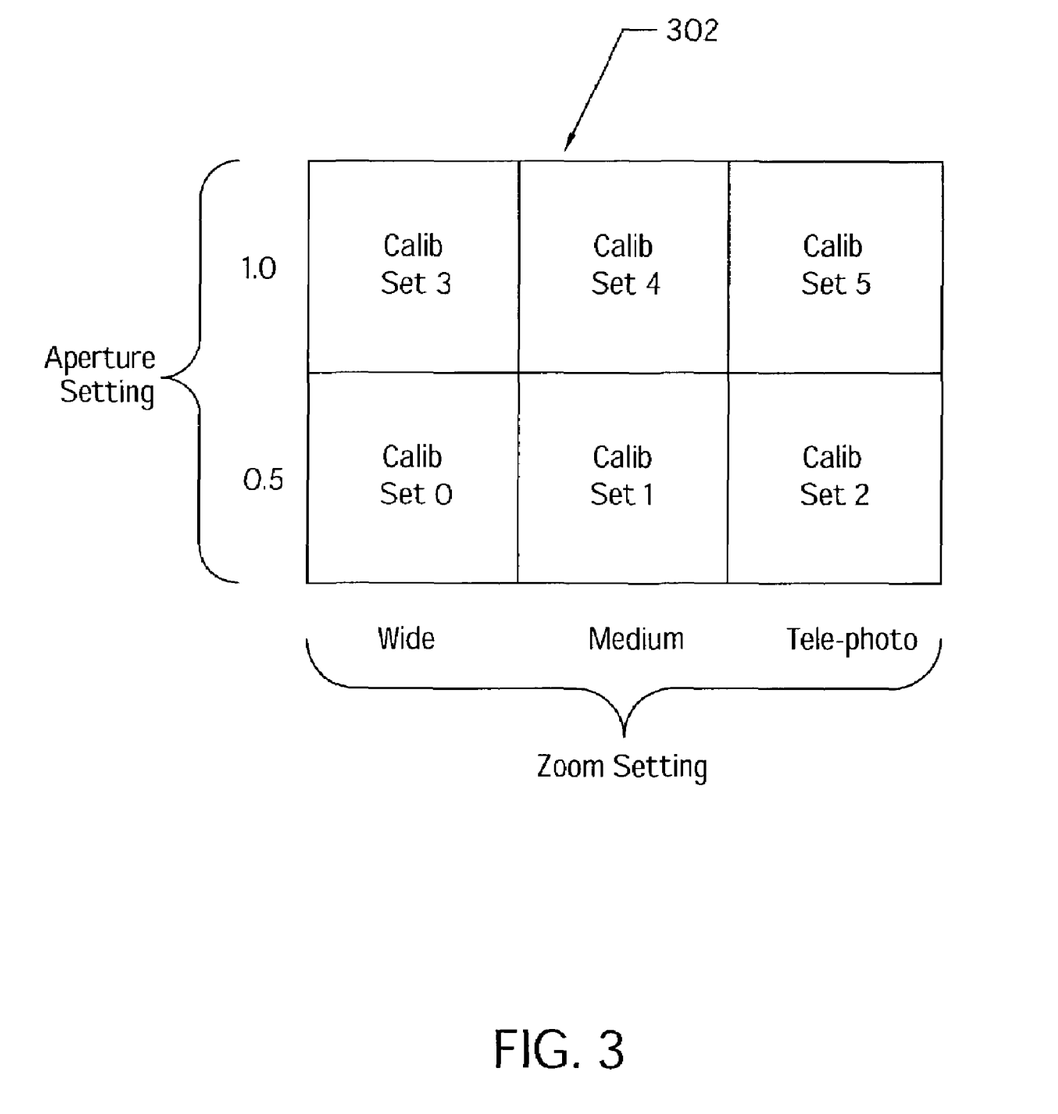
FIG. 3 is a pictorial representation of mapping used to select a calibration set according to an embodiment of the invention.

An example of such an LUT 302, which can be stored in the flash memory device 120, is depicted in FIG. 3. There, the rows correspond to the two (2) aperture settings, while the columns correspond to the three (3) zoom settings. If a raw image 100 is captured using an aperture of 1.0 and a zoom setting of telephoto, the calibration set No. 5 will be selected to correct the raw array 200. The LUT 302 treats or maps the other parameters of the camera as don't-care conditions, i.e., the values to which these other parameters are adjusted has no effect upon the selection of the appropriate calibration set. It is contemplated that other sets of calibration data and/or other mappings can be used.

Once an appropriate calibration set has been selected via the LUT 302, then the pixels in the raw array 200 must be corrected. An embodiment of the invention corrects each pixel in the raw array. Fewer than every pixel can be corrected, but image quality will decrease as fewer of the pixels are corrected.

As each pixel array is corrected, calibration factors for each pixel will be needed. An embodiment of the invention determines a calibration factor for each pixel. This can be accomplished by interpolating to form an entire calibration array that is the same size as the raw array and then correcting each pixel. Alternatively, and preferably, an entire calibration array is not formed and stored before pixels are corrected; rather, each calibration factor is interpolated as it is needed and then discarded. This latter technique reduces the amount of memory that is temporarily consumed to store the expanded or interpolated calibration array.

Figure 5:
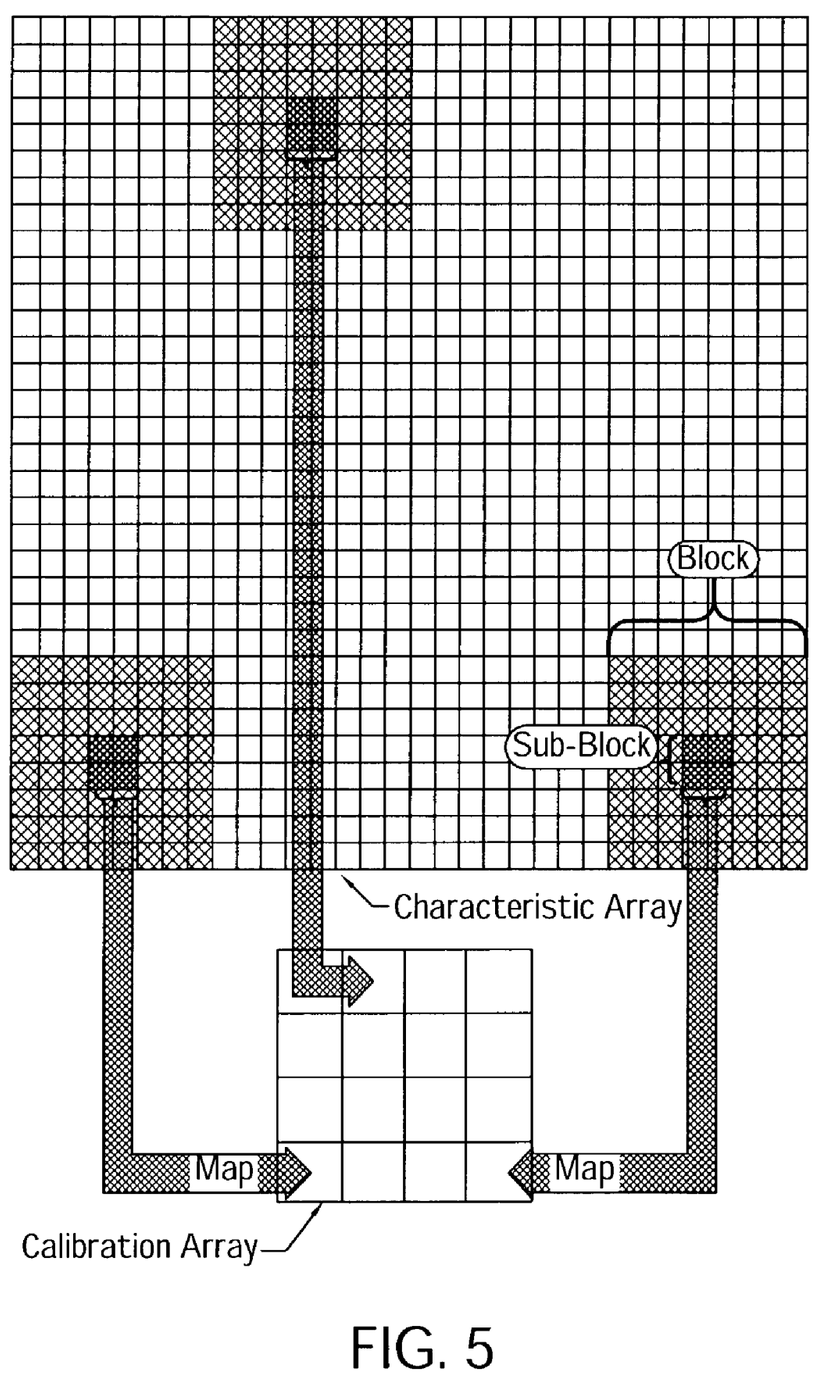
FIG. 5 is a depiction of the mapping used to form each of the calibration arrays in a calibration set, respectively, according to an embodiment of the invention.

In an embodiment of the invention, each calibration plane in a calibration set is reduced in size relative to a raw array of data. This can be desirable because it reduces the amount of the flash memory device 120 that is consumed with the storage of the calibration sets. FIG. 5 symbolically depicts how the reduced calibration array is formed. A raw plane of characteristic data (again corresponding to an image of a calibration source) is divided into blocks. A sub-block is used to determine a representative value for the block that is stored in the corresponding entry in the calibration array. Preferably, the sub-block is centered within the block.

As each calibration factor is determined by interpolation during the correction, the calibration array is, in effect, expanded back to the size of a raw array. The expansion technique can be as simple as using the representative value in the calibration array for each pixel in a raw array found in the block corresponding to the particular calibration value. This can be less desirable because it is less granular.

Figure 4:
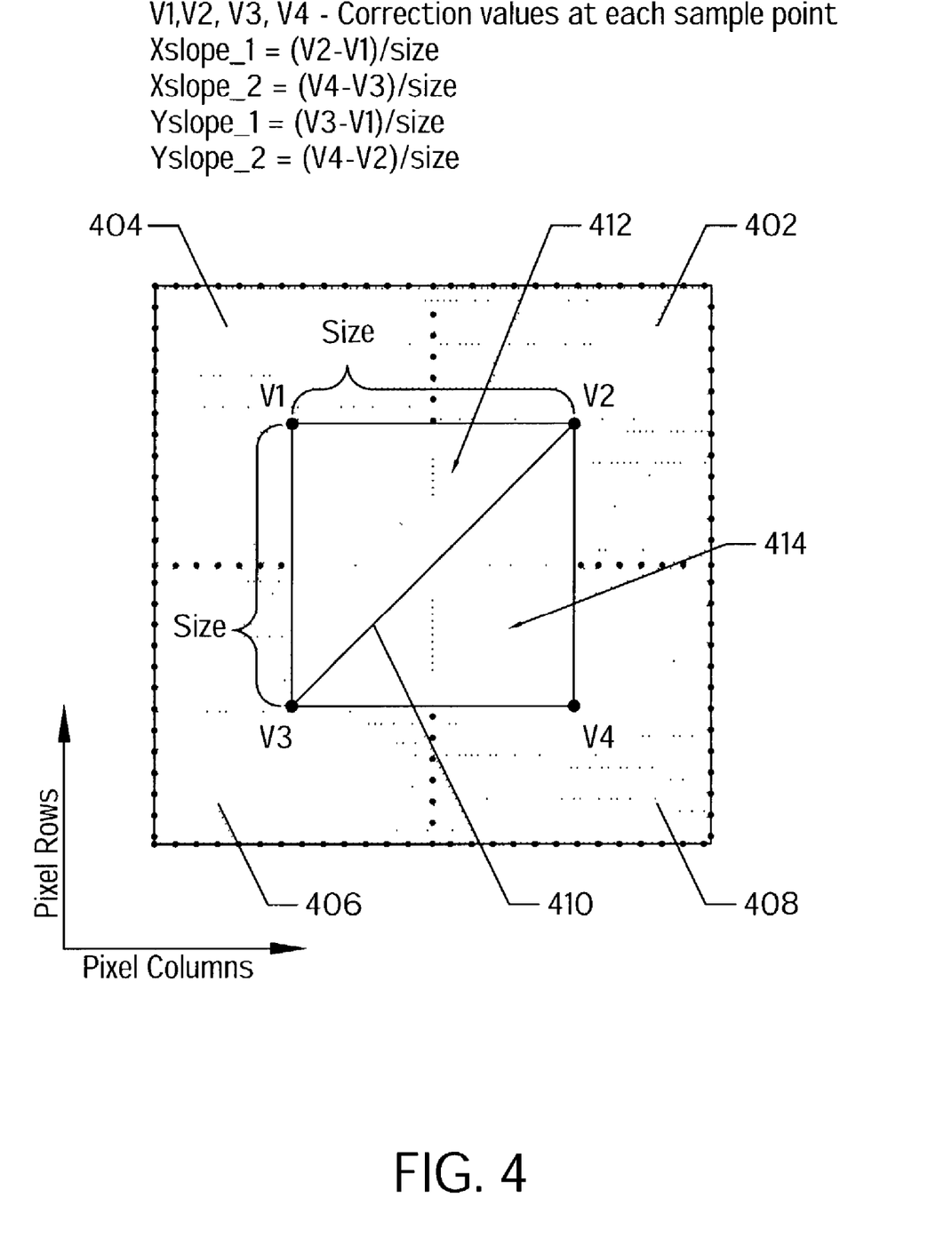
FIG. 4 is a depiction of an example calibration array referred to below in a discussion of how a calibration array is interpolated, in effect, to form an expanded calibration array according to an embodiment of the invention.

A more granular interpolation technique according to another embodiment of the invention is described using FIG. 4, which depicts a portion of an example calibration array. There, four (4) values in the calibration array, V1, V2, V3 And V4, have been shown. The square defined by V1, V2, V2 and V4 is shown as being superimposed on corresponding blocks 402, 404, 406 and 408, respectively (using dashed lines), in a raw array 200. Each value, V#, represents the center of its corresponding block. Using a version of the well-known computer-graphics technique of Gouraud shading (a type of polygon shading), a discrete calibration coefficient for each corresponding raw pixel can be interpolated.

For the more granular interpolation, suppose that V1 is the calibration array value corresponding to the X and Y coordinates (x,y)=(0,0). In a box bounded by V1, V2, V3 and V4, the coordinates of V4 would be (N,N) assuming the box has N×N pixels. So V2 would have the coordinates (N,O) and V3 would be (O,N).

A diagonal line 404 has been drawn between the values V2 and V3. The presence of the diagonal line 410 divides the box bounded by V1, V2, V3 and V4 into an upper left triangle 412 and a lower right triangle 414. The calculation of calibration factors in the upper left triangle 412 uses the slopes Xslope_1 and Yslope_1. Calculation of the calibration factors in the lower right triangle 414 uses Xslope_2=(V4−V3)/size and Yslope_2=V4−(V2)/size, where size=V2−V1=V1 −V3. Calibration of the factors along the diagonal line 420 can be calculated using either Xslope_1 and Yslope_1 or Xslope_2 and Yslope_2.

Within the triangle 412, the upper left corner can be defined as the coordinate pair (x1,y1) where $V_{x1,y1}$=V1, the lower left corner as (x1,y2)=(x1,y1+size) where $V_{x1,y1+size}$=V3, and the upper right corner as (x2,y1)=(x1+size,y1) where $V_{x1+size,y1}$=V2. So for triangle 412, Eq. No. 1 provides the generic equation for C(x,y) as follows:

$$C_{412}(x,y) = V_{x1,y1} + (Xslope\_1)*(x-x1) + (Yslope\_1)*(y-y1) \quad (1)$$

If it is assumed that (x1,y1) is (0,0), and recalling that $V_{x1,y1}$=V1, then Eq. No. 1 simplifies as follows:

$$C_{412}(x,y) = V1 + (Xslope\_1)*(x) + (Yslope\_1)*(y) \quad (2)$$

Plugging in values for the coordinates x and y into either Eq. No. 1 or Eq. No. 2 yields the following values for C(0,0), C(0,1), C(1,0), C(1,1), etc.

$$C_{412}(0,0) = V1 + (Xslope\_1)*0 + (Yslope\_1)*0$$
$$= V1$$
$$C_{412}(0,1) = V1 + (Xslope\_1)*0 + (Yslope\_1)*1$$
$$= V1 + (Yslope\_1)$$
$$C_{412}(0,1) = V1 + (Xslope\_1)*1 + (Yslope\_1)*0$$
$$= V1 + (Xslope\_1)$$
$$C_{412}(1,1) = V1 + (Xslope\_1)*1 + (Yslope\_1)*1$$
$$= V1 + (Xslope\_1) + (Yslope\_1)$$

Similarly, within the triangle 414, the lower right corner can be defined as the coordinate pair (x1+size,y1+size) where $V_{x1+size,y1+size}$=V4, the lower left corner (again) as (x1,y2)=(x1,y1+size) corresponding to V3, and the upper right corner (again) as (x2,y1)=(x1+size,y1) corresponding to V2. So for triangle 414, Eq. No. 3 provides the generic equation for C(x,y) as follows:

$$C_{414}(x, y) = V_{x1+size,y1+size} + \quad (3)$$
$$(Xslope\_2)*[(x1 + size) − x] + (Yslope\_2)*[(y1 + size) − y]$$

Where the calculations progress along a row or down a column, i.e., the row or column value does not change, then the calculation is iterative. Within the triangle 412, and in the first row (row zero), the iteration would be:

$$C_{412}(0,1) = C_{412}(0,0) + Xslope\_1$$
$$C_{412}(0,2) = C_{412}(0,1) + Xslope\_1$$
$$C_{412}(0,3) = C_{412}(0,2) + Xslope\_1$$
$$\vdots$$

Generalizing the iterative equation yields (within the triangle 412, and for progression along a row, i.e., from left to right):

$$C_{412}(M+1,N) = C_{412}(M,N) + Xslope\_1$$

where N=constant and 1≦M≦size.

The iterative equation similarly can be generalized (within the triangle 412, and for progression along a column):

$$C_{412}(P,Q+1) = C_{412}(P,Q) + Yslope\_1$$

where P=constant and 1≦Q≦size.

Iterative equations can similarly be generalized for progression along a row or a column, respectively, within the triangle 414.

Not all of the calibration factors are calculated using the Gouraud shading of FIG. 4. Inspection of FIG. 4 reveals that there is a peripheral region open (denoted by stippling) outside the square bounded by V1, V2, V3 and V4. In FIG. 4, the stippled regions can be viewed as corresponding to blocks at the corners. In practice, not only will there be corner blocks that are part of the peripheral region of the raw array, but there can also be edge blocks (between corner blocks) that are part of the peripheral region. Different techniques are used to interpolate the calibration factors for the peripheral region.

The corner and edges have no blocks from which to calculate the slope. But the slope can be extrapolated from within the block. As an example, assume box 404 is the upper left-most box in the image depicted in FIG. 4. Where the value V1 has coordinates (0,0), a value to the left of V1 would have a negative X coordinate while a value above the value V1 would have a negative Y coordinate. Or assume that box 408 is the lower right-most box in the image, where the value V4 has coordinates (N,N), then a value that is K pixels to the right of valve V2 would have a positive X coordinate equal to N+K while a value K pixels below the value V4 would have a positive Y coordinate equal to N+K. For example, to get C(−1,0), the Xslope_1 component is subtracted (because X is negative) from V1 according to the above-noted equations. To get C(0,−1), the Yslope_1 component is subtracted (because Y is negative) from V1 (again, using the above-noted equations). In this way, one can get calibration values for pixels perpendicular to the edges which are based on the trend from the original data. The same technique can be applied to the corners.

Either the ASIC 106 or the microcontroller 128 of the camera 100 can be used to interpolate each calibration factor and/or scale the corresponding raw pixel using the calibration factor. The equations for such scaling are:

The equations for color correction of a pixel, namely R(x, y), G(x,y), or B(x,y), are:

$$R_{corr}(x,y)_r = C_R(x,y) * R_{raw}(X,Y)$$

$$B_{corr} = C_B * B_{raw}$$

$$G_{corr} = C_G * G_{raw}$$

where $C_R$, $C_B$ and $C_G$ are the red, blue and green calibration factors, respectively. It must be remembered that the correction factor, $C_G$, for a raw green data array is equal to one in a green-normalization scenario, i.e., $C_G=1$, so. $G_{corr}=G_{raw}$.

Figure 6:
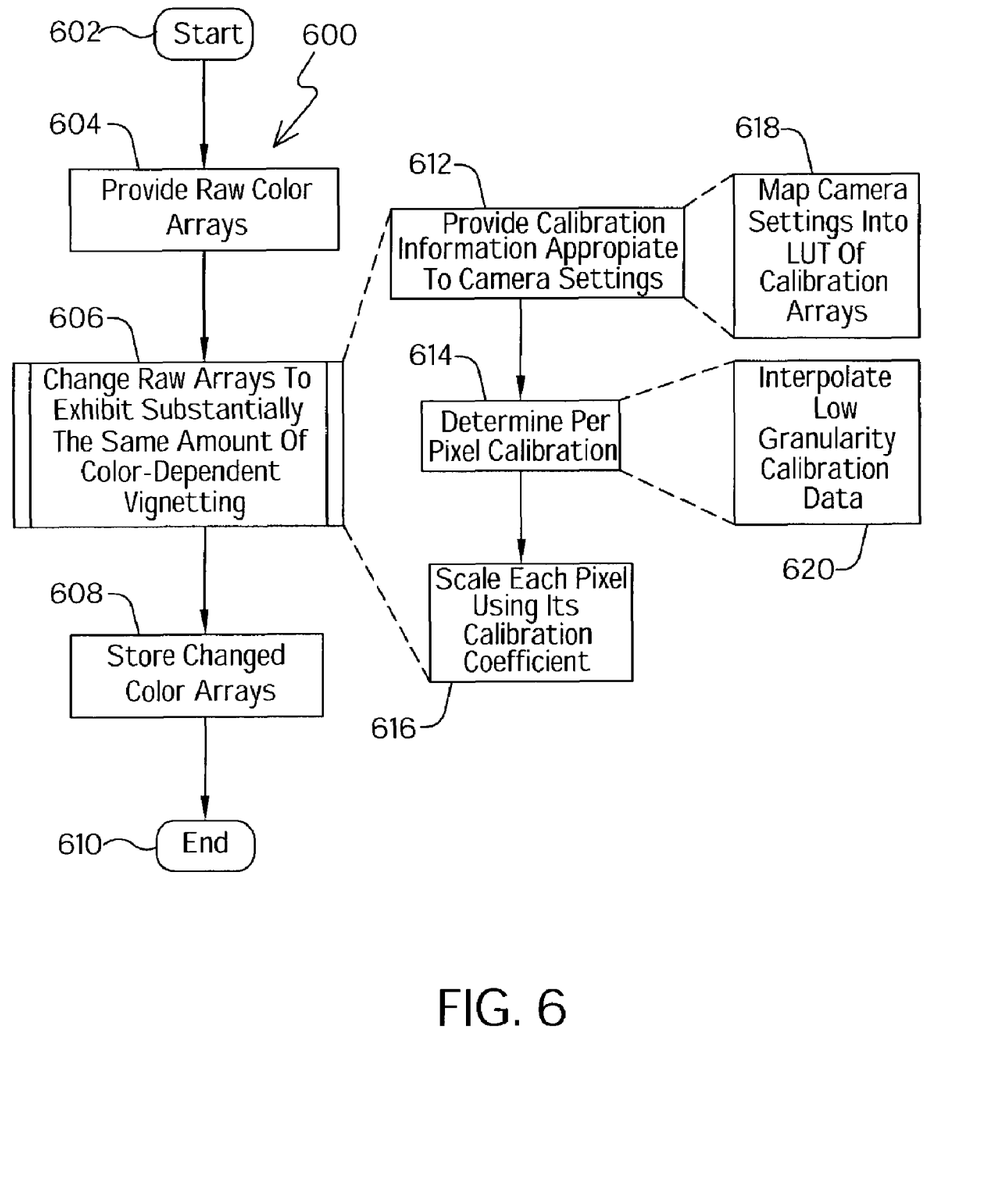
FIG. 6 is a flow chart depicting a method according to an embodiment of the invention.

FIG. 6 is a flow chart 600 depicting a method according to an embodiment of the invention. Flow starts at step 602 and proceeds to step 604, where raw color arrays are provided, e.g., via the CCD 102, etc., resulting in the three (3) color planes or arrays 202R, 202G and 202B (again as depicted in FIG. 2). At the next step 606, the raw arrays are changed so as to exhibit substantially the same amount of color-dependent vignetting. At the next step 608, the changed color arrays are stored. Flow proceeds then to step 610, where flow ends.

Step 606 can be embodied, e.g., via steps 612-616. At step 612, calibration information, appropriate to the settings of the camera 100, are provided, e.g., by selecting respective color arrays of calibration data corresponding to the settings of the camera 100. At the next step 614, each pixel's calibration coefficients are determined based upon the corresponding entries in the calibration arrays. At the next step 616, each pixel is scaled, e.g., changed, using its calibration coefficient.

Step 612 can be embodied, e.g., by step 618 in which the camera settings are mapped via a look-up table (LUT) 302 of calibration arrays. Step 614 can be embodied, e.g., via step 620, in which low granularity data of the respective calibration arrays are interpolated to form the calibration coefficients for each pixel.

The size of the calibration arrays in a calibration set represents a compromise between how much internal flash memory 120 is consumed versus how much processing will be needed to produce a calibration factor at the time of correction. Storing larger arrays reduces the number of interpolations needed during correction, so correction can be accomplished more quickly. But larger calibration arrays translate into a larger, more expensive camera. On the other hand, storing smaller arrays increases the number of interpolations needed during correction. If the speed of the interpolating processor, e.g., ASIC 106 or microcontroller 128, is not correspondingly improved (with an associated increase in camera cost), then the speed of the correction will correspondingly decrease. The appropriate balance between the size of the array and the processor speed depends upon the particular architecture of the camera as well as the target price point and performance for the camera in its relevant market.

Except for dark frame subtraction, it is anticipated that the color-dependence correction should take place preferably before any other data manipulation such as demosaicing, color correction, preferred tone, etc. Dark frame subtraction should occur before the color-dependence correction otherwise it is necessary to correct two images). While it is not strictly necessary to correct the color-dependence first, it has been found that doing so (before all but the dark frame subtraction) simplifies and/or improves the other calculations. Alternatively, the raw images could be kept temporarily in the flash memory 120. Then, later, the camera 100 could be connected to the external work station 124 which could perform the color-correction calculation and either store the corrected image back in the internal flash memory 120 or store them itself.

Advantages exhibited by the invention include the following.

Embodiments of the invention relax requirements upon the lens, the CCD, the flash device and (optionally) other optical filters in a digital camera that would otherwise be more stringent if color-dependent vignetting were not removed by digital processing. This can make these components less complex, lower in cost and/or smaller in size than similar components for a camera that does not utilize this invention.

Embodiments of the invention can provide improved image quality for photographs taken with a digital camera utilizing the invention because vignetting and color-dependent vignetting can be reduced by an amount up to and including zero (0). Such high performance is not possible using the Background Art's solution of placing stringent requirements on the lenses, CCD flash unit, etc., in order to remove color-dependent vignetting.

Embodiments of the invention make it possible to design any amount of vignetting, non-color dependent, or color-dependent, into the camera systems through the use of digital image processing. Design of a certain amount of non-color-dependent vignetting into the camera system can be used to achieve a certain amount of artistic content in a image. In the Background Art, where vignetting was controlled by the physical attributes of the lens, CCD flash unit, etc., the same amount of vignetting is applied to all photographs. This is much less flexible, in affect, allowing for no variation in the amount of vignetting according to artistic reference.

It is very difficult, if not impossible, to eliminate or set the vignetting to be the same for different apertures (F-numbers) and zoom position in a camera system that deals with vignetting only by way of the physical attributes of the lens, CCD flash unit, etc., as in the Background Art. Therefore, a camera that does not use embodiments of the invention according to the invention will produce different amounts of vignetting for photographs taken with different settings for the operational parameters of the camera. Embodiments of the present invention allow a digital camera to produce an image with substantially the same vignetting for all zoom positions and apertures in camera.

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed:

1. A method of correcting color-dependent vignetting in a digital camera, the method comprising:
   providing a raw array of data corresponding to an image of a scene for each color that said camera can image; and
   providing a plurality of candidate vignetting correction schemes;
   determining values of operating parameters to which parameters of the camera were adjusted when the respective raw arrays were captured;
   selecting a vignetting correction scheme from among the plurality of candidates based upon the determined values; and
   adjusting the raw arrays according to the selected scheme such that the array for each color exhibits substantially the same amount of vignetting so as to reduce color-dependent vignetting in a composite image based upon each of the adjusted arrays.

2. The method of claim 1, wherein said providing includes:
capturing, via said camera, said raw array of data for each color.

3. The method of claim 1, wherein said adjusting produces adjusted arrays, the method further comprising:
storing each adjusted array as the respective data array corresponding to said image.

4. The method of claim 1, wherein said storing overwrites locations of said raw arrays in memory with corresponding values of the adjusted arrays, respectively.

5. The method of claim 1, wherein said providing provides can image a red array, a green array and a blue array for each scene.

6. The method of claim 1, wherein said adjusting is performed entirely by processing circuitry within said camera or entirely by a processor external to said camera.

7. The method of claim 1, wherein the step of adjusting includes:
reducing an amount of color-dependent vignetting without necessarily having to reduce an amount of non-color-dependent vignetting.

8. The method of claim 1, wherein:
the plurality of candidate vignetting correction schemes correspond to a plurality of combinations of values for camera operating parameters, respectively.

9. The method of claim 8 wherein,
the plurality of candidate schemes includes sets of calibration data appropriate to the combinations of parameter values to which the camera parameters were adjusted when the respective raw arrays were captured; and
the step of adjusting, for each raw array of color data, includes using the corresponding set of calibration data so as to, for each pixel do at least the following,
determine a calibration coefficient for the pixel based upon the corresponding set of calibration data; and
scale the pixel by the corresponding calibration coefficient.

10. The method of claim 9, wherein said providing of the appropriate calibration array includes:
providing a first plurality of arrays of calibration data corresponding to a second plurality of combinations of parameter values to which said camera parameters were adjusted;
wherein a total number of possible combinations of parameter values to which said camera parameters could be set is greater than the number of said first plurality of calibration arrays; and
selecting the appropriate calibration array based upon a predetermined mapping between the total number of parameter-value combinations and said first plurality of calibration arrays.

11. The method of claim 10, wherein said first plurality of calibration arrays are differentiated from each other by the respective corresponding raw arrays having been captured under different zoom settings and aperture settings; and
wherein said mapping maps from said total number of parameter-value combinations to said first plurality of calibration arrays based upon zoom setting and aperture.

12. The method of claim 11, wherein said zoom setting can include the values wide, medium and telephoto, and said aperture can include the values A and B; and
wherein said first plurality of calibration arrays includes calibrations arrays corresponding to the following pairings of zoom setting and aperture: wide zoom and aperture A; medium zoom and aperture A; telephoto zoom and aperture A; wide zoom and aperture B; medium zoom and aperture B; and telephoto zoom and aperture B.

13. The method of claim 11, wherein said mapping is look-up table mapping.

14. The method of claim 9, wherein each calibration array is a low granularity calibration array, relative to the granularity of a raw array, such that each entry in the calibration array maps to a block of pixels in the raw array;
wherein the determining of a calibration coefficient includes:
interpolating a value for the calibration coefficient based upon four corresponding values in the low granularity calibration array.

15. The method of claim 14, wherein said interpolating includes polygon shading based upon said four corresponding values.

16. The method of claim 14, wherein each block is the same size, said size being one of 32×32 and 64×64.

17. A system of correcting color-dependent vignetting in a digital camera, the system comprising:
an imager for providing a raw array of data corresponding to an image of a scene for each color that said camera can image;
a memory to store a plurality of candidate vignetting correction schemes; and processing circuitry to do at least the following,
determine values of operating parameters to which parameters of the camera were adjusted when the respective raw arrays were captured,
select a vignetting correction scheme from among the plurality of candidates based upon the determined values, and
adjust the raw arrays according to the selected scheme such that the array for each color exhibits substantially the same amount of vignetting so as to reduce color-dependent vignetting in a composite image based upon each of the adjusted arrays.

18. The system of claim 17, wherein said imager is operable to capture said raw array of data for each color.

19. The system of claim 17, wherein said processing circuitry produces adjusted arrays, the system further comprising:
at least one memory to store the adjusted arrays as the respective data arrays corresponding to said image.

20. The system of claim 17, wherein said processing circuitry is operable to overwrite locations of said raw arrays in said at least one memory with corresponding values of the adjusted arrays, respectively.

21. The system of claim 17, wherein said imager is operable to image a red array, a green array and a blue array for each scene.

22. The system of claim 17, wherein said processing circuitry is one of processing circuitry within said camera or processing circuitry external to said camera.

23. The system of claim 17, wherein the processing circuitry is operable to change the raw arrays by being further operable to reduce an amount of color-dependent vignetting without necessarily having to reduce an amount of non-color-dependent vignetting.

24. The system of claim 17, wherein:
the plurality of candidate vignetting correction schemes correspond to a plurality of combinations of values for camera operating parameters, respectively.

25. The system of claim 24, wherein:
the plurality of candidate schemes includes sets of calibration data appropriate to the combinations of parameter values to which the camera parameters were adjusted when the respective raw arrays were captured; and
for the raw array corresponding to each color, said processing circuitry is operable to process each raw array of color data using the corresponding set of calibration so as, for each pixel, to do at least the following,
determine a calibration coefficient for the pixel based upon the corresponding set of calibration data, and
scale the pixel by the corresponding calibration coefficient.

26. The system of claim 25, wherein, when doing said providing of the appropriate calibration array, said processing circuitry is operable to:
provide a first plurality of arrays of calibration data corresponding to a second plurality of combinations of parameter values to which said camera parameters were adjusted;
wherein a total number of possible combinations of parameter values to which said camera parameters could be set is greater than the number of said first plurality of calibration arrays; and
select the appropriate calibration array based upon a predetermined mapping between the total number of parameter-value combinations and said first plurality of calibration arrays.

27. The system of claim 26, wherein said first plurality of calibration arrays are differentiated from each other by the respective corresponding raw arrays having been captured under different zoom settings and aperture settings; and
wherein said mapping maps from said total number of parameter-value combinations to said first plurality of calibration arrays based upon zoom setting and aperture.

28. The system of claim 27, wherein said zoom setting can include the values wide, medium and telephoto, and said aperture can include the values A and B; and
wherein said first plurality of calibration arrays includes calibrations arrays corresponding to the following pairings of zoom setting and aperture: wide zoom and aperture A; medium zoom and aperture A; telephoto zoom and aperture A; wide zoom and aperture B; medium zoom and aperture B; and telephoto zoom and aperture B.

29. The system of claim 28, further comprising a look-up table ("LUT") wherein is stored said mapping.

30. The system of claim 25, wherein each calibration array is a low granularity calibration array, relative to the granularity of a raw array, such that each entry in the calibration array maps to a block of pixels in the raw array;
wherein, when doing the determination of a calibration coefficient, said processing circuitry is operable to interpolate, for non-edge and non-corner portions of the raw array, a value for the calibration coefficient based upon four corresponding values in the low granularity calibration array.

31. The system of claim 30, wherein, when doing the interpolating, said processing circuitry is operable to perform polygon shading based upon said four corresponding values.

32. The system of claim 30, wherein each block is the same size, said size being one of 32×32 and 64×64.

33. A computer-readable medium having code portions embodied thereon that, when read by a processor, cause said processor to perform the method of claim 1.

34. A system of correcting color-dependent vignetting in a digital camera, the system comprising:
imaging means for providing a raw array of data corresponding to an image of a scene for each color that said camera can image; and
a memory to store a plurality of candidate vignetting correction schemes; and
means for providing a plurality of candidate vignetting correction schemes;
means for determining values of operating parameters to which parameters of the camera were adjusted when the respective raw arrays were captured;
means for selecting a vignetting correction scheme from among the plurality of candidates based upon the determined values; and
adjustment means for adjusting the raw arrays according to the selected scheme such that the array for each color exhibits substantially the same amount of vignetting so as to reduce color-dependent vignetting in a composite image based upon each of the adjusted arrays.

35. The system of claim 34, wherein the adjustment means for adjusting the raw arrays is further for reducing an amount of color-dependent vignetting without necessarily having to reduce an amount of non-color-dependent vignetting.

36. The system of claim 34, wherein:
the plurality of candidate vignetting correction schemes correspond to a plurality of combinations of values for camera operating parameters, respectively.

* * * * *

UNITED STATES PATENT AND TRADEMARK OFFICE
CERTIFICATE OF CORRECTION

PATENT NO. : 7,502,057 B2  Page 1 of 1
APPLICATION NO. : 10/174970
DATED : March 10, 2009
INVENTOR(S) : Christopher A Whitman et al.

It is certified that error appears in the above-identified patent and that said Letters Patent is hereby corrected as shown below:

In column 9, line 29, in Claim 9, after "claim 8" insert -- , --.

In column 9, line 29, in Claim 9, delete "wherein," and insert -- wherein: --, therefor.

In column 11, line 8, in Claim 25, after "calibration" insert -- data --.

Signed and Sealed this

Twenty-fifth Day of August, 2009

David J. Kappos
*Director of the United States Patent and Trademark Office*